Oct. 23, 1956 C. D. WRIGHT 2,768,136
GAS DISCHARGE DEVICE FOR SEWAGE DIGESTION TANKS
Filed Dec. 23, 1953 3 Sheets-Sheet 1

INVENTOR.
Carl D. Wright,
BY
Fidler, Crown & Beardsley
Atty's

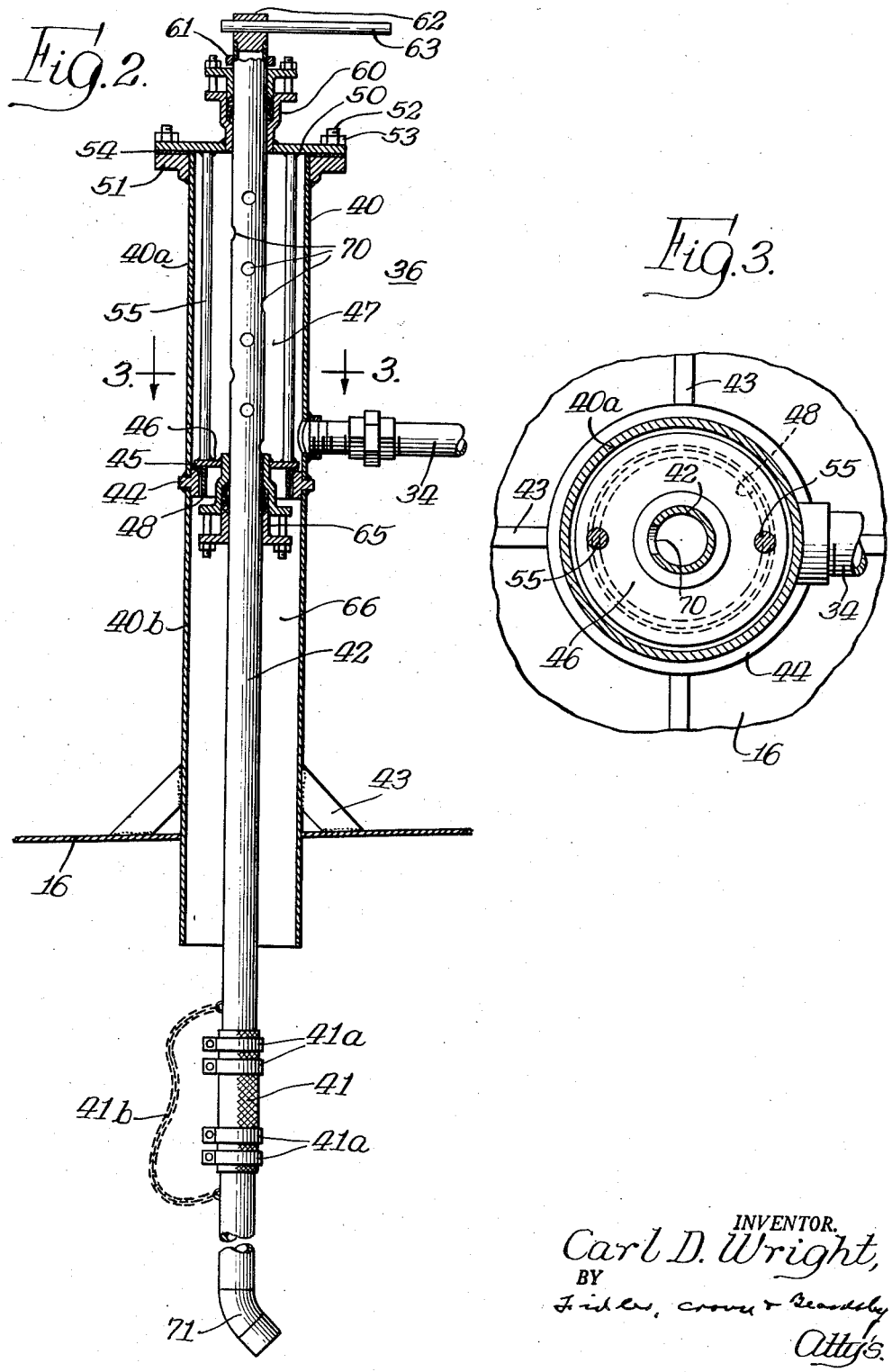

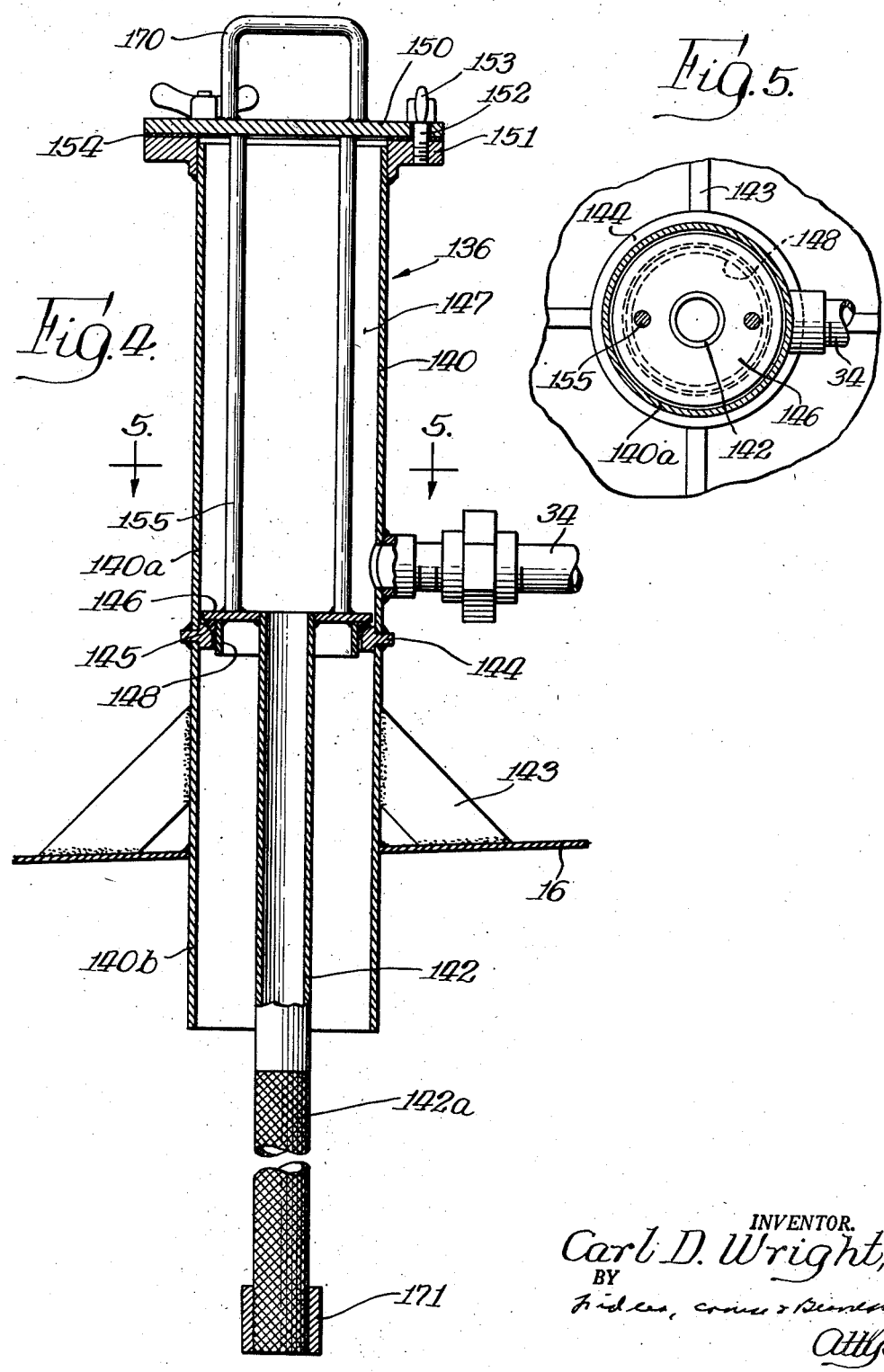

United States Patent Office 2,768,136
Patented Oct. 23, 1956

2,768,136

GAS DISCHARGE DEVICE FOR SEWAGE DIGESTION TANKS

Carl D. Wright, Chicago, Ill., assignor to Pacific Flush Tank Company, Chicago, Ill., a corporation of Illinois Application December 23, 1953, Serial No. 399,999

11 Claims. (Cl. 210—2)

The invention relates to apparatus for digesting sludge and has to do more particularly with a novel device for discharging gas into the contents of a digester.

In the digestion or anaerobic fermentation of organic matter as encountered in sewage sludge, trade waste and garbage to be disposed of and as carried out in digestion tanks serious problems are encountered by reason of the formation of a layer of scum which forms at the top surface of the digesting mass. Various procedures have been employed to keep such scum accumulations within desirable minimum depth and volume. One of the most successful procedures is one wherein gas evolved in the digestion of sludge is introduced under pressure into the digesting mass below any scum formed thereon. Such procedure may include the collection of gas evolved from the digestion of the sludge and introduction of the gas into the same mass from which the gas was evolved, or alternatively the gas may be obtained from another source, as for example, the digestion of sludge in another tank.

The sludge gas is introduced into the digesting mass below the level of any scum which may tend to form on the surface of the material undergoing digestion and preferably above the level of the best digested material at the bottom of the tank so as to prevent agitating such material. Preferably the gas is introduced into the digester contents at a plurality of points distributed throughout the tank so as to ensure an effective dispersion of the scum with a minimum introduction of gas.

An object of the present invention is to provide a novel and improved device for introducing gas into the mass of material undergoing digestion in a digester tank.

Another object is to provide a device for discharging gas into the digesting material in a digester tank which device is simple and inexpensive to manufacture and install, which may be installed readily in an existing digester tank and which is wholly effective for the purpose intended.

Another object is to provide a device for introducing gas into the digesting material in a digester tank which is adapted to discharge gas into the digesting material throughout a zone of substantial area.

Still another object is to provide a device for discharging gas into the digesting material in a digester tank which device is so constructed as to permit convenient adjustment of the position of the discharge outlet thereof relatively to the tank whereby the gas may be discharged at any one of a large number of desired locations.

A further object is to provide a device for discharging gas into the digesting material in a digester tank which device is so arranged that the discharge outlet thereof is automatically positioned at a predetermined location below the level of the digesting material.

A further object of the invention is the provision of a device for introducing gas into the digesting material in a digester tank which device includes a gas discharge pipe extending into the digester tank, which device is so constructed as to permit ready removal and replacement of the pipe by a pipe having a different length, thereby to change the point of discharge of gas, without necessitating disconnection or removal of any other pipes or connections or disturbing digester operation.

A further object is to provide a device for introducing gas into the digesting mass of material in a digester which device includes a discharge pipe adapted to be inserted into the digester tank, the pipe being so constructed as to permit insertion in the tank without interference by any pipes which may be located within the digester such as conduits for withdrawing sludge for heating it externally of the digester, for introducing sludge, and for withdrawing evolved gas.

Other objects and advantages of the invention will appear from the following description taken in connection with the appended drawings wherein:

Fig. 2 is an enlarged, fragmentary, cross-sectional view through a discharge device constructed in accordance with the present invention;

Fig. 3 is an enlarged, cross-sectional view taken along line 3—3 of Fig. 2;

Fig. 4 is a view similar to Fig. 2 showing a modified form of the invention; and Fig. 5 is a sectional view taken along line 5—5 of Fig. 4.

Figure 1:
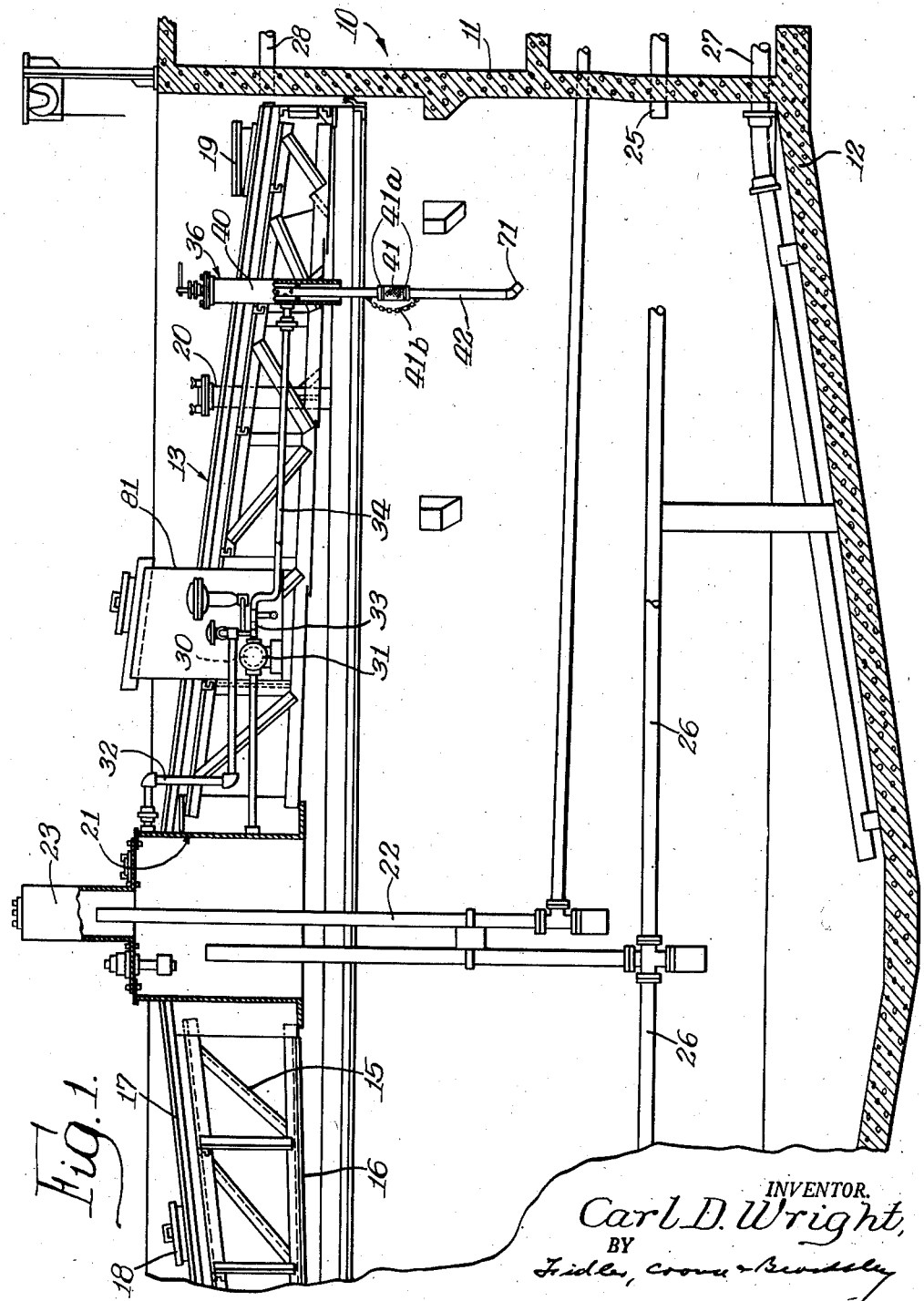
Figure 1 is a fragmentary, cross-sectional view through a digester embodying the present invention.

The discharge device of the present invention is adapted for installation either with a digester of the type wherein the cover is fixed or a digester of the type wherein the cover is adapted to float on the contents of the digester and adjust its height in accordance with the level of the digester contents. The discharge device is particularly well adapted for use with apparatus wherein means for collecting and compressing gas evolved during digestion of the digester contents is carried by the digester cover. However, the discharge device also is suitable for use where the source of gas under pressure is located externally of the digester and is not carried on the digester cover. The discharge device of the present invention is especially well adapted for use with digestion apparatus such as disclosed and claimed in the copending application of Harry E. Schlenz and Lawrence E. Langdon executed on November 16, 1953, Serial No. 393,202 filed November 19, 1953, which application is assigned to the same party as the present application, and is disclosed in connection with such use although it is not limited to such use. The discharge device is disclosed in connection with such digestion apparatus.

Referring now to Fig. 1 the digester 10 may be of conventional construction or it may be provided, as shown, with apparatus for recirculating the sludge gas as disclosed in the aforesaid copending Schlenz and Langdon application. The digester 10 includes a side wall 11, a bottom slab 12 and a cover 13 which preferably is of the well known "floating" type and adapted to float on the contents of the digester.

The cover 13 which may be of any suitable construction preferably includes a truss-like frame 15, an imperforate ceiling plate 16 and a roof 17 with the usual entrance hatch 18, an access manhole 19 and a sampling well 20. The cover 13 thus is well adapted to receive and carry a portion of all of the gas recirculating apparatus including the discharge device of the present invention.

The cover 13 also is provided with the usual gas dome 21 adapted to receive and collect gas which is evolved during the digestion of the digester contents. A gas take-off conduit 22 leads from the upper, reduced portion 23 of the gas dome 21 and extends out of the digester to a point of utilization of the gas.

The digester 10 is also provided with a conduit 25 in a known manner for withdrawing sludge and/or liquor for the purpose of heating such sludge and/or liquor externally of the digester and a conduit 26 for returning withdrawn heated sludge and/or liquor and introducing additional raw sludge to be digested.

A drawoff conduit 27 is provided, with its inlet adjacent the bottom of the digester, for withdrawing digested sludge solids. An overflow line 28 is provided for withdrawing supernatant or digester liquor in a known manner.

Means are provided for collecting sludge gas evolved during the digestion, compressing such gas and introducing such compressed gas under pressure into the digester contents below the level of any scum which may have formed thereon and preferably at a plurality of locations spaced throughout the digester contents.

To the foregoing end a compressor 30 is provided which is driven by an electric motor 31 and has its intake connected by a drawoff pipe 32 to the gas dome 21. Connected to the discharge end of the compressor 30 is a conduit 33 to which is connected in turn a plurality of distributing conduits 34 (one of which is shown) each of which leads to corresponding gas discharge means 36, one of which is shown in detail. The compressor 30, motor 31 and certain safety and control devices (not shown) preferably are enclosed in a housing 81.

The gas discharge device, sometimes known as a discharge "well," serves to introduce the sludge gas into the digester contents below the level of any scum which may have formed thereon and above the level of the best digested material at the bottom of the tank so as to prevent agitating such material. Each gas discharge device 36 includes a vertically disposed tubular casing 40 which extends down through and is suitably secured in the ceiling plate 16 as by braces 43 welded to the casing 40 and plate 16. The casing 40 is provided intermediate its ends with a flanged annular seat member 44 which is secured in the casing and supports an annular gasket or sealing ring 45 formed of rubber or other suitable resilient sealing material. Conveniently the casing 40 is formed of two sections 40a and 40b abutting opposite faces of the flange portion of the ring 44 and secured thereto as by welding.

The casing 40 is provided with a partition or wall 46 seated on the sealing ring 45 and closing the casing, except as hereinafter described, to thereby define with the casing a chamber 47 above the wall member 46.

Secured to and depending from the lower face of the wall member 46 is a short tubular flange-like extension 48 adapted to enter the ring 44 and serve both as means for guiding the wall 46 into proper seating position on the sealing ring 45 and to aid in forming a seal between the ring 44 and the wall 46.

The upper end of the casing 40 and consequently the upper end of the chamber 47 is closed by a removable cap or end plate 50 supported on a flange ring 51 suitably secured to the upper end of the casing 40 as by welding. The cap 50 is removably secured in position as by bolts 52 extending from the flange 51 and through the cap 50 and by nuts 53 threaded on the bolts. A sealing gasket 54 is disposed between the flange 51 and cap 50 to provide a gas-tight seal. The cap 50 is connected to the wall member 46 by a plurality of rods 55 whereby the wall 46 may be removed from the casing conveniently by merely removing and raising the cap 50.

The distributing conduit 34 is secured at its outer end in the wall of the casing 40 above the wall 46 and opens into the chamber 47.

A discharge pipe 42 extends through the casing 40 and extends downwardly below the bottom end of the casing and into the digester tank to a point below the level of the digester contents but well above the level of the best digested material as illustrated particularly in Fig. 1. The discharge pipe extends through and is sealingly supported in the cap 50 by a stuffing box 60 rigidly secured to the cap 50 as by welding. The stuffing box 60 provides a seal around the upper end of the pipe 42 but permits angular adjustment of the pipe about its longitudinal axis throughout 360 degrees for a purpose which will hereinafter appear. The pipe 42 is retained against downward movement relative to the stuffing box 60 by a flange 61 provided on the end of the pipe which projects above the stuffing box 60, which flange may take the form of a ring secured to the pipe as by welding. The upper end of the pipe 42 is closed by an end plug 62 rigidly secured therein as by welding. A handle 63 is carried by the end plug 62 whereby the pipe 42 may be turned about its longiutdinal axis to any position of angular adjustment throughout a complete circle of 360 degrees.

A second stuffing box 65 through which the pipe 42 extends is secured to and depends from the wall 46 which stuffing box preferably is similar to the upper stuffing box 60. It will be seen from the foregoing that the pipe 42 is sealed in the cap 50 and the wall 46. Also it will be seen that the wall 46 is sealingly seated on the ring seat member 44. Thus there is no communication between the chamber 47 and the portion of the casing interior 66 below the wall 46 except through the pipe 42. Communication between the chamber 47 and the interior of the pipe 42 is provided by a plurality of perforations 70 in the portion of the pipe which extends through the chamber 47. Accordingly gas may flow out of the chamber 47 and into the digester but only through the pipe 42.

The lower end portion 71 of the pipe 42 is inclined or bent at an angle to the longitudinal axis of the pipe so that the lower open end of the pipe faces at an angle to the longitudinal axis of the pipe. Thus, gas discharged from the lower end of the pipe 42 is discharged at an angle to the longitudinal axis of the pipe. That is to say, the gas is discharged laterally from the pipe and not downwardly.

The pipe 42 is provided at a point intermediate its ends and preferably slightly below the lower end of the casing 42 with a semiflexible section 41 which may be formed by a flexible hose and which is connected to the sections of the pipe above and below such flexible section suitably as by clamps or couplings 41a. Preferably a short chain 41b or like member is connected to the pipe sections above and below the semiflexible section 41 to retain the lower section of the pipe 42 should either of the couplings 41a be loosened.

In the operation of the digester embodying the present invention the compressor 30 is driven to draw gas from the gas dome 21 through the drawoff pipe 32, the gas being compressed by the compressor 30 and discharged therefrom from the discharge conduit 33 from whence it passes to the distributing conduits 34. The gas passes from the conduit 34 into the chamber 47 of the corresponding discharge device and from thence into the openings 70 into the pipe 42. The gas is discharged from the pipe 42 through the lower discharge opening in a direction determined by the angular position of adjustment of the pipe 42 about its longitudinal axis.

As explained in the aforesaid Schlenz and Langdon application certain controls may be provided whereby the gas is discharged from each of the gas discharge devices successively during predetermined periods. Accordingly, gas preferably is discharged from one of the discharge devices for a predetermined period after which it will be discharged from other of the discharge devices thereby ensuring effective dispersion of the scum with the circulation of relatively small quantity of gas. However, regardless of whether one or a plurality of discharge devices are employed and regardless of whether the gas is discharged therefrom successively or simultaneously, the operation of each discharge device will be the same. The angular adjustability of the discharge pipe 42 permits the discharge of gas during any period of discharge from the well to be effected over a larger zone or area than would be possible were the pipe fixed and not angularly adjustable. In other words, the discharge of gas may be permitted from the pipe 42 for a predetermined period while the latter is in one position after which the pipe may be rotated to bring the discharge outlet to another position for further discharge of gas from that pipe in another direction. Thus it will be seen that the pipe may be adjusted to a series of different positions during the period of discharge of gas therefrom whereby the gas is discharged over a substantial area during any period of such discharge and adjustment of the position of the pipe.

As previously indicated, the cap 50 and the members connected thereto including the pipe 42 may be removed from the casing 40 by first removing the bolts 53 and then lifting the assembly to withdraw the pipe 42 completely from the digester and the casing 40. Thus removal of the pipe 42 may be readily accomplished and a pipe of a different length may be substituted. It will be understood, of course, that where the discharge device is employed with a floating cover the lower discharge end of the pipe 42 will at all times be located at a predetermined level, below the level of the digester contents. In other words, the lower ends of the pipe will move up and down as the cover moves so as to be maintained at a predetermined level below the level of the digester contents. Ordinarily, therefore, it will not be necessary to change the length of the pipe 42. However, under certain circumstances, changes in the depth of the layer of scum may make it desirable to provide a discharge pipe of a different length than the one previously used. Where that is the case the discharge pipe may be readily removed in the simple manner above described and replaced and it is not necessary to disconnect the fixed pipe connections leading to the several discharge devices or to disturb the digester operation.

The arrangement of fixed pipes within a digester tank (such as the pipes for withdrawing sludge, for introducing sludge and for withdrawing gas) may be such that they would interfere with lowering of the discharge pipes 42 into the tank. However, the semiflexible section 41 provided in each of the discharge pipes 42 permits the section of pipe below such point to rock or deflect sufficiently whereby the discharge pipes may be lowered past such interfering piping without damage either to the piping or to the discharge pipes, or without any interference with the adjustment or operation of the discharge pipes.

Referring now to Figs. 4 and 5 there is shown a second embodiment of the invention. The gas discharge device or well 136 includes a vertically disposed casing 146 having an annular seat member 144 disposed between and secured to the two sections 140a and 140b, the casing 140 being secured in the ceiling plate 16 as above described by braces 143. A partition or wall member 146 having an annular tube-like extension 148 is seated on the member 144 and sealed by a sealing ring 145.

The partition or wall member 146 defines with the upper casing member 140a a chamber 147 which is closed at its upper end by a removable cap or end plate 150 supported on a flange ring 151 and removably secured in position as by screws 152 and wing nuts 153. The cap 150 is sealed in place by a sealing gasket 154 interposed between the cap 150 and the flange 151.

The cap 150 is connected to the wall member 146 by rods 155 whereby the latter is removable with the cap 150, a handle 170 being secured to the cap 150 to facilitate such removal.

A discharge pipe 142 is secured in the wall 146 and opens into the chamber 147. The discharge pipe 142 extends downwardly through the casing 140 and into the digester tank to a point below the level of the digester contents but well above the level of the best digested material. The portion 142a of the discharge pipe from slightly below the lower end of the casing 140 is formed as a flexible hose. Accordingly gas discharged into the digester causes the free end of the flexible hose to move about and thus introduce gas into the digester contents over a distributed area rather than at a single point. A weight 171 preferably is attached to the lower end of the flexible hose section 142a which serves to return the free end of the hose to its lowermost position.

The operation form of the discharge well illustrated in Figs. 4 and 5 is generally similar to that described in the form illustrated in Figs. 4 and 5. However the discharge pipe 142 is not arranged for rotational adjustment about its axis but depends upon the flexible nature of the lower section 142a to distribute the gas through the digester contents. The flexibility of the lower section permits the pipe to be lowered into the digester without interference by the fixed piping in the digester or damage to the pipe 142 or the fixed piping.

From the foregoing it will be seen that the present invention provides a device for discharging gas into the digester contents which device is simple and inexpensive to manufacture and install and which may be installed readily in an existing digester tank. The device is carried by the digester cover and hence where a floating type cover is employed the discharge end of the discharge pipe goes up and down with the floating cover so that the discharge end of the device is always maintained at a predetermined distance below the level of the digester contents. However, where it is desired to adjust the level to which the gas is discharged this may be accomplished readily by removing the discharge pipe and replacing it by a discharge pipe of a different length determined by the level at which it is desired to discharge the gas. This may be accomplished without necessitating the disconnection of any fixed connections such as the distributing pipes extending from the compressor to the several discharge wells or disturbing digester operation.

I claim:

1. A sludge digester comprising a tank, a cover for said tank, means fixed to said cover for collecting gas evolved by the digesting mass, means fixed to said cover for compressing said collected gas, and means for introducing said compressed gas into the digester, said last means including a tubular casing fixed to said cover with its lower end opening into said digester and its upper end opening externally of said digester, a wall defining with said casing a chamber above said wall, an inlet pipe connected to said compressing means and opening into said chamber, an outlet pipe mounted in said casing for removal therefrom without disturbing the connection between said inlet pipe and said casing, said outlet pipe opening into said chamber and into said digester respectively, a closure removably closing the upper end of said chamber, and means connecting said outlet pipe to said closure for removal therewith from said casing.

2. In a sludge digester of the type including a tank and a cover for said tank, a device for discharging gas into said digester comprising a tubular casing in said cover with its lower end opening into said digester and its upper end opening externally of said digester, a wall defining with said casing a chamber above said wall, an inlet pipe leading into said chamber, an outlet pipe mounted in said casing for removal therefrom without disturbing the connection between said inlet pipe and said casing, said outlet pipe opening into said chamber and extending through said wall and opening into said digester, a closure removably closing the upper end of said casing and means connecting said outlet pipe to said closure for removal therewith from said casing.

3. In a sludge digester of the type having a tank and a cover for said tank, a device for discharging gas into said digester comprising a tubular casing in said cover with its lower end opening into said digester and its upper end opening externally of said digester, a wall defining with said casing a chamber above said wall, an inlet pipe leading into said chamber, an outlet pipe opening into said chamber and extending through said wall and into said digester and having a discharge opening facing laterally with respect to the longitudinal axis of said discharge pipe, a closure closing the upper end of said casing and means for adjusting said outlet pipe angularly about its longitudinal axis.

4. In a sludge digester of the type having a tank and a cover for said tank, a device for discharging gas into said digester comprising a tubular casing in said cover with its lower end opening into said digester and its upper end opening externally of said digester, a wall defining with said casing a chamber above said wall, an inlet pipe leading into said chamber, an outlet pipe opening into said chamber and having its lower end in said digester and inclined at an angle to the longitudinal axis of said outlet pipe with the end of said outlet pipe open and providing a discharge opening facing at an angle to said longitudinal axis, a closure closing the upper end of said casing and means for adjusting said outlet pipe angularly about its longitudinal axis.

5. In a sludge digester of the type having a tank and a cover for said tank, a device for discharging gas into said digester comprising a tubular casing in said cover with its lower end opening into said digester and its upper end opening externally of said digester, a wall defining with said casing a chamber above said wall, an inlet pipe leading into said chamber, a closure closing the upper end of said casing, an outlet pipe extending through said closure and wall and into said digester, said outlet pipe having an opening leading into said chamber and an opening leading into said digester, and means sealingly supporting said outlet pipe in said closure and wall for angular adjustment about its longitudinal axis.

6. In a sludge digester of the type having a tank and a cover for said tank, a device for discharging gas into said digester comprising a tubular casing in said cover with its lower end opening into said digester and its upper end opening externally of said digester, a wall defining with said casing a chamber above said wall, an inlet pipe leading into said chamber, an outlet pipe opening into said chamber and extending through said wall and into said digester with its lower end portion extending at an angle to the principal longitudinal axis of said pipe and open to provide a discharge outlet, the portion of said outlet pipe within said digester having a flexible section above said lower end portion and a closure removably closing the upper end of said casing.

7. In a sludge digester of the type including a tank and a cover for said tank, a device for discharging gas into said digester comprising a tubular casing in said cover with its lower end opening into said digester and its upper end opening externally of said digester, a wall defining with said casing a chamber above said wall, an inlet pipe opening into said chamber, an outlet pipe mounted in said casing for removal therefrom without disturbing the connection between said inlet pipe and said casing, said outlet pipe opening into said chamber and extending through said wall and having a flexible lower end portion opening into said digester, a closure closing the upper end of said casing and means connecting said outlet pipe to said closure for removal therewith from said casing.

8. The invention as set forth in claim 7 wherein is provided a weight secured to the lower end of said outlet pipe.

9. In a sludge digester of the type having a tank and a cover for said tank, a device for discharging gas into said digester comprising a tubular casing having one end opening into said digester and the other opening externally of said digester, a seat in said casing, a wall removably and sealingly seated on said seat and defining with said casing a chamber above said wall, an inlet to said chamber, an outlet pipe secured in said wall for removal from said casing without disturbing the connection between said inlet pipe and said casing and opening at one end into said chamber and extending at the other end into said digester, a closure removably and sealingly closing the outer end of said casing and means connecting said closure and wall for removal of said wall and outlet pipe with said closure.

10. A sludge digester comprising a tank, a cover for said tank, means fixed to said cover for collecting gas evolved by the digesting mass, means fixed to said cover for compressing said collected gas, and means for introducing said compressed gas into the digester, said last means including a tubular casing fixed to said cover with its lower end opening into said digester and its upper end opening externally of said digester, a wall element removably disposed in said casing and defining with said casing a chamber above said wall element, an inlet pipe connected to said compressing means and opening into said chamber, an outlet pipe secured in said wall element and opening into said chamber and into said digester respectively, a closure removably closing the upper end of said chamber, and means connecting said wall element to said closure for removal of said wall element and outlet pipe therewith from said casing.

11. In a sludge digester of the type including a tank and a cover for said tank, a device for discharging gas into said digester comprising a tubular casing in said cover with its lower end opening into said digester and its upper end opening externally of said digester, a wall element removably disposed in said casing and defining with said casing a chamber above said wall element, an inlet pipe leading into said chamber, an outlet pipe secured in said wall element and opening into said chamber and extending through said wall and opening into said digester, a closure removably closing the upper end of said casing and means connecting said wall element to said closure for removal of said wall element and outlet pipe therewith from said casing.

References Cited in the file of this patent

UNITED STATES PATENTS

| | | |
|---|---|---|
| 659,359 | Burr | Oct. 9, 1900 |
| 1,991,264 | Thomas et al. | Feb. 12, 1935 |
| 2,383,946 | Tietig | Sept. 4, 1945 |
| 2,640,027 | McNamee et al. | May 26, 1953 |